Oct. 8, 1968　　　　　　　　F. G. WILLOX　　　　　　　3,405,280
AIRCRAFT
Filed March 29, 1966　　　　　　　　　　　　　　　　7 Sheets-Sheet 1
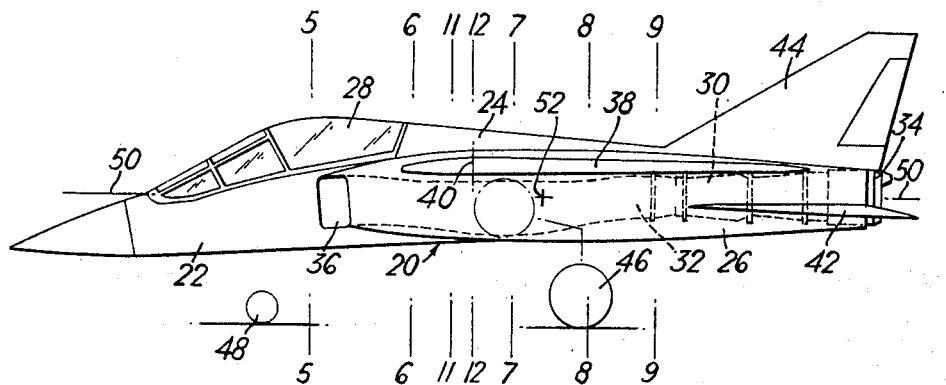
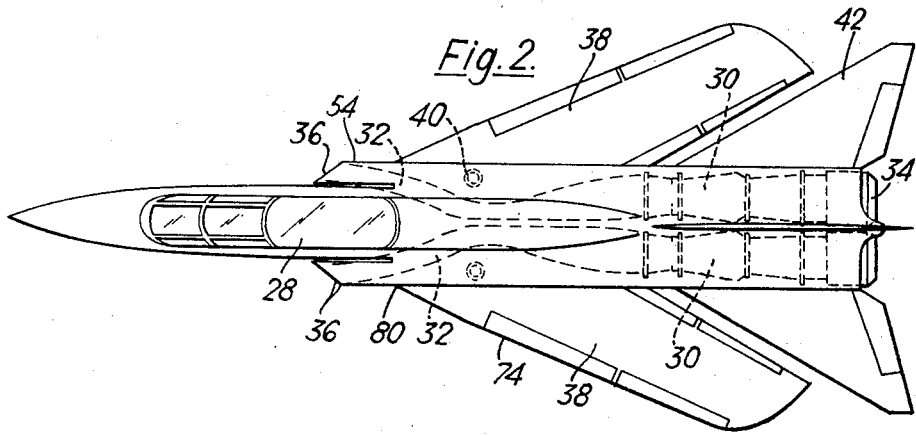
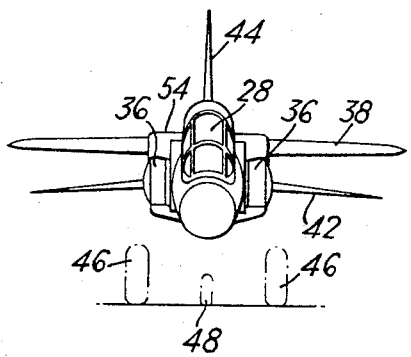
Inventor
FRANK GERRIE WILLOX
By
Bailey, Stephens & Huettig
Attorneys

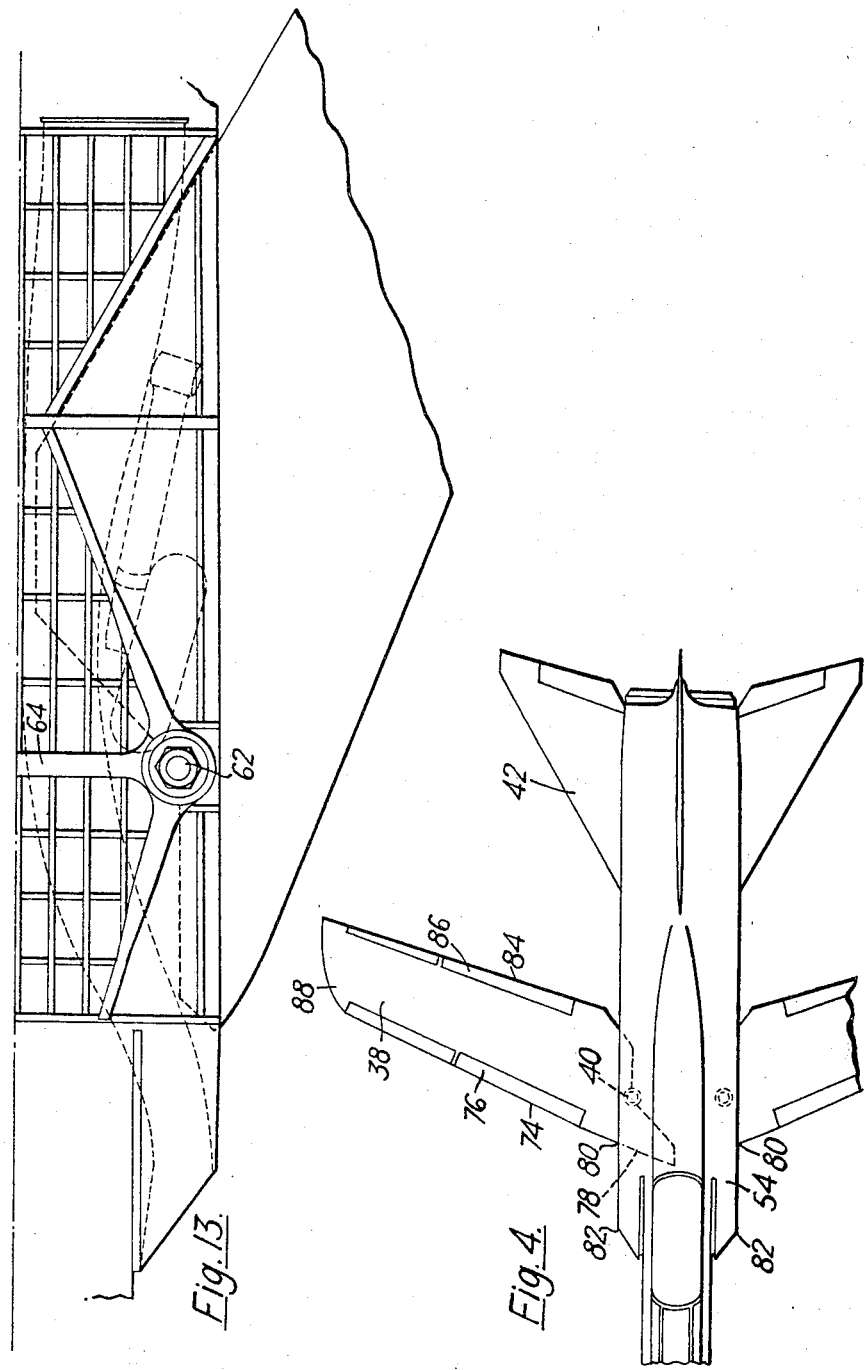

Oct. 8, 1968   F. G. WILLOX   3,405,280
AIRCRAFT
Filed March 29, 1966   7 Sheets-Sheet 3
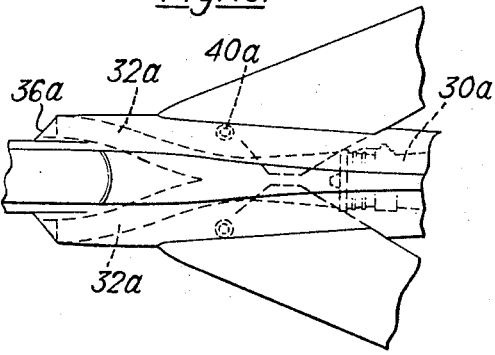
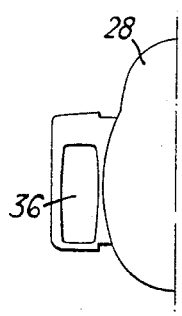
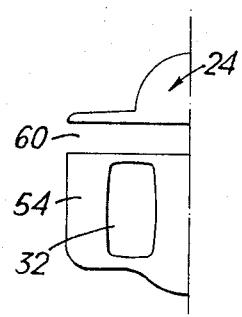
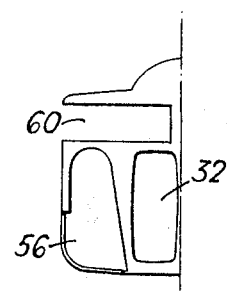
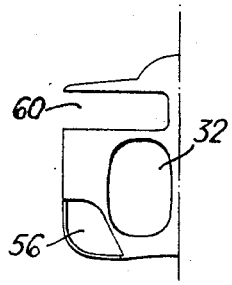
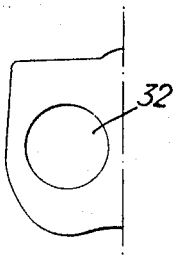
Inventor
FRANK GERRIE WILLOX
By
Bailey, Stephens & Huettig
Attorneys Oct. 8, 1968     F. G. WILLOX     3,405,280
AIRCRAFT Filed March 29, 1966     7 Sheets-Sheet 4

Inventor
FRANK GERRIE WILLOX
By
Bailey, Stephens & Huettig
Attorneys

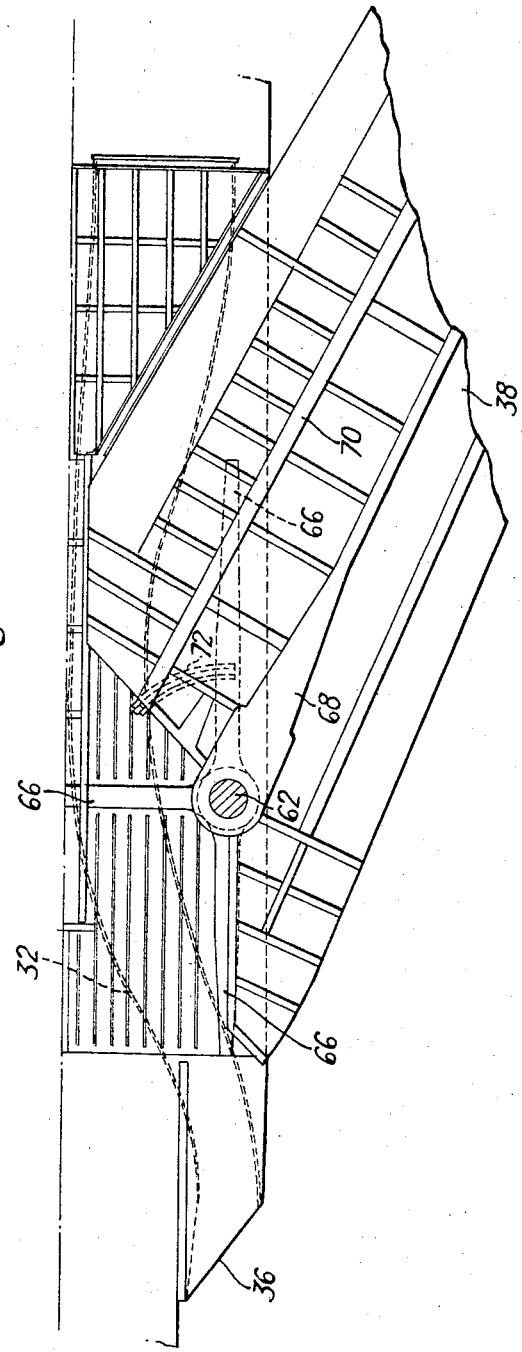

United States Patent Office 3,405,280
Patented Oct. 8, 1968

3,405,280
AIRCRAFT
Frank Gerrie Willox, Wrea Green, Preston, Lancashire, England, assignor to British Aircraft Corporation (Operating) Limited, a British company
Filed Mar. 29, 1966, Ser. No. 539,610
Claims priority, application Great Britain, Apr. 1, 1965, 13,967/65
4 Claims. (Cl. 244—46)

ABSTRACT OF THE DISCLOSURE

A swing wing aircraft has wings mounted in "shoulder" position and pivoted about fixed vertical pivots on a fuselage. At least one air-breathing jet propulsion engine is mounted at the rear of the fuselage. Air intake ducts extend from the front of the fuselage to the engine or engines, extending beneath the wing and having a total width abreast of the wing pivots of about half the width between the pivot axes and a depth equal to the major depth of the fuselage beneath the wings. Under carriage units are mounted for retraction forwards, upwards and inwards into a housing adjacent to and below the pivots and outboard of the intake ducts.

---

This invention concerns the configuration of aircraft having main wings which can swing between a laterally extended position and a swept-back position. Such aircraft are known as variable-sweep aircraft; they are capable of operating over a very wide range of speed, and can thus be used for a variety of purposes.

An aircraft according to the present invention comprises a fuselage having at each side a wing which is pivoted to the fuselage about a substantially vertical axis so as to swing between a laterally extended position and a swept-back position, and at each side an air intake duct with an open forward end, the rear ends of the intake ducts being connected to at least one air-breathing jet propulsion engine in the fuselage, the width between the meeting places of the fuselage with the leading edges of the pivoted wings being substantially the same as the width between the lateral outer boundaries of the forward ends of the air intake ducts, and these lateral outer boundaries being a substantial distance forward of the said meeting places.

Figure 10:
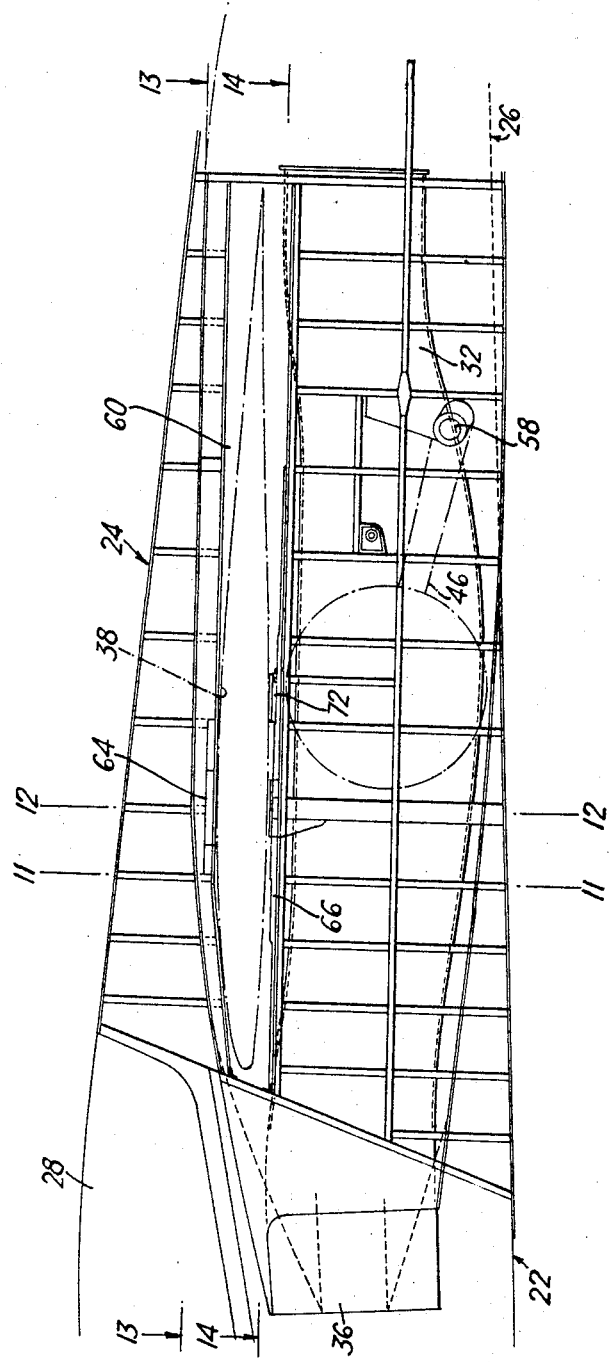
Figure 11:
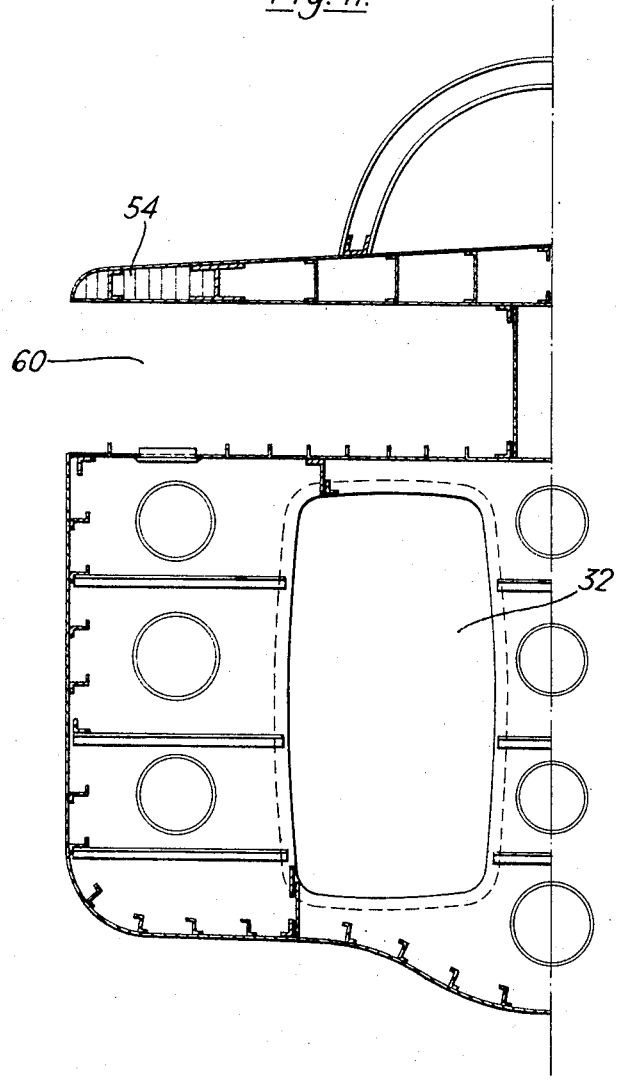
Figure 12:
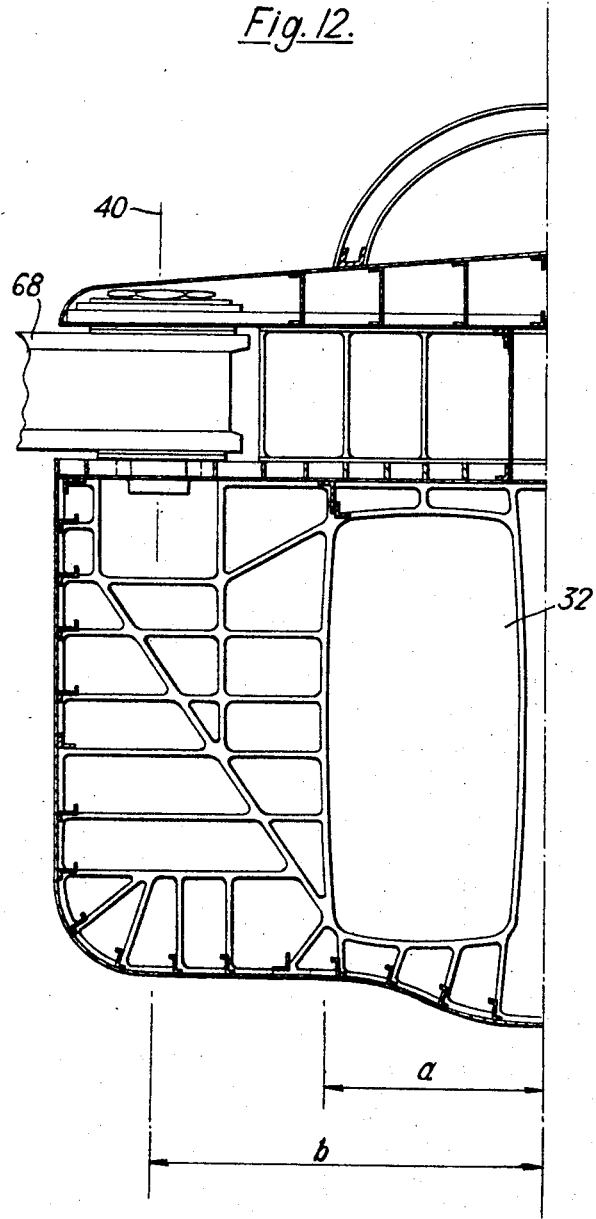

The invention will be more fully explained with reference to the examples shown in the accompanying drawings. In these drawings:

FIGURE 1 is a side elevation of one aircraft;
FIGURE 2 is a plan, with the wings in swept-back position;
FIGURE 3 is a front elevation;
FIGURE 4 is a fragmentary plan with the wings in laterally extending position;
FIGURES 5 to 9 are diagrammatic cross sections of one-half of the fuselage, taken on the lines 5—5 etc. which are shown in FIGURE 1;
FIGURE 10 is a side elevation of the central part of the fuselage, on a larger scale, showing the construction, somewhat diagrammatically;
FIGURES 11 and 12 are cross sections, on the lines 11—11 and 12—12, respectively in FIGURE 10, on a further enlarged scale, showing one-half of the fuselage;
FIGURE 13 is a view of one-half of the centre part of the fuselage, together with a wing root, seen on the line 13—13 in FIGURE 10;
FIGURE 14 is a view of the structure of the wing root, and of the fuselage immediately beneath the wing root, seen on the line 14—14 in FIGURE 10; and
FIGURE 15 is a fragmentary diagrammatic plan, similar to part of FIGURE 2, but showing a second aircraft.

The general shape and layout of the first example is shown in FIGURES 1 to 9. The aircraft has a fuselage 20 which is constructed as a forward part 22, a central part 24, and an aft part 26. The aircraft is intended for training, and the forward part 22 includes a cockpit 28 to accommodate a pilot with an instructor sitting behind and slightly above him. The aft part 26 houses two gas turbine jet propulsion engines 30, side by side. Each engine has a separate air intake duct 32, and a separate discharge nozzle 34.

The air intake ducts 32 lie in the central part 24 of the fuselage, and have forward ends 36 lying on either side of the cockpit 28. At each side of the central part 24 of the fuselage, a wing 38 is pivoted to the fuselage about a fixed substantially vertical axis 40. Mechanism, which is not shown, and which forms no part of the present invention, can swing the wings between the laterally extended position shown in FIGURE 4 and the swept-back position shown in FIGURE 2. The wings may also be held in intermediate positions.

A tail plane 42 is connected to the aft part 26 of the fuselage, and, as can be seen from FIGURES 1 and 3, the tail plane 42 is at a level substantially below that of the wings 38. A fin 44 is also connected to the aft part 26 of the fuselage.

When the aircraft is at rest on the ground, it is supported on two main undercarriage wheels 46, and a front wheel 48.

The shape of the fuselage may conveniently be described with reference to a longitudinal datum line 50 (see FIGURE 1) which is horizontal when the aircraft is at rest on the ground, and which passes through the centre of gravity 52 of the aircraft (this is the position of the centre of gravity with the wings swept-back). The fuselage, from the nose as far aft as the centre of gravity, has a basic shape of substantially circular cross section, the centres of the circles being progressively below the datum line towards the nose, and the size of the circles diminishing forwards to a point. To this basic shape is added an upper enclosure of elongated "tear-drop" shape to accommodate the heads and shoulders of the pilot and instructor. There are also added lateral projections 54 which start from the forwardly-facing air intakes 36. From the air intakes rearwards, the overall width of the fuselage remains substantially uniform, and the shape of circular cross section plus lateral projections undergoes a progressive transition rearwards into two circular-section nozzles 34 side by side. The lateral projections 54 increase in height, but not width, for some distance rearwards from the air intakes, so that abreast of the centre of gravity 52 the tops of the lateral projections merge into the top of the basic shape of the fuselage, and the bottoms of the lateral projections merge into the bottom of the basic shape, or nearly so.

FIGURES 5 to 9 illustrate the progressive change in cross sectional shape of the fuselage from front to rear, and also show the position of the intake duct 32.

The lateral projections 54 each provide a housing 56 for a main undercarriage unit 46 when retracted by a forwards, upwards, and inwards movement. FIGURES 10 and 13 show the retracted position of the undercarriage unit 46, which has an oblique pivot axis 58. The housings 56 lie outboard of the intake ducts 32, and these ducts 32 are curved in plan, as shown in FIGURES 2, 13 and 14, and thereby leave room for the housings 56 without any increase in overall width of the fuselage.

Ahead of and aft of the undercarriage housing 56, the lateral projections 54 accommodate fuel tanks, which are not shown in detail.

Horizontal slots 60 in the lateral projections 54, above the intake ducts 32 and undercarriage housings 56, receive the roots of the main wings 38. The structure of the connection between the wings and the fuselage is shown in more detail in FIGURES 10 to 14. The pivot axis 40 is defined by a shaft 62 extending between upper and lower reinforcing members 64 and 66, each in the form of a boss with radiating arms. The shaft 62 serves as a journal for the inner end of a main spar 68 of the wing 38. A secondary spar 70 carries a member which cooperates with a guide 72 on the lower side of the slot 60.

The general construction of the centre part 24 of the fuselage is indicated in FIGURES 10, 11 and 12; it consists of longitudinal members and transverse bulkheads. FIGURE 11 shows a typical bulkhead, while FIGURE 12 shows a reinforced bulkhead in the plane containing the pivot axes 40.

As shown in FIGURE 12, the air intake ducts 32 abreast of the pivot axes 40 lie within an overall width (twice the dimension indicated at (a)) which is about one-half of the width between the pivot axes (twice the dimension indicated at (b)). Thus the intake ducts, when they pass through the reinforced bulkhead shown in FIGURE 12, do not seriously weaken it, although they have a depth substantially equal to the major part of the depth of the fuselage below the wings.

In this twin-engine aircraft, as shown particularly in FIGURE 2, the two intake ducts 32 lie close together abreast of the pivot axes.

FIGURE 15 illustrates an alternative arrangement in a single-engine aircraft. Here there are two air intake ducts 32a, with forward ends 36a, and a single engine 30a. The two air intake ducts 32a meet at a place substantially abreast of the pivot axes 40a, and a single duct continues rearwards to the inlet of the engine 30a.

A particular feature of both the aircraft shown in the drawings is that the lateral projections 54 make a minimum of encroachment on the leading edges 74 of the wings. This is of particular importance during slow-speed flight, when the wings are in the laterally extended position shown in FIGURE 4. It is then desirable to have leading-edge flaps, as indicated at 76, along as much as possible of the leading edge. The fact that the wing is variable in sweep necessarily means that some part of the leading edge must be enclosed within the fuselage when the wing is in the laterally extended position, and this is indicated at 78 in FIGURE 4. However, an important feature of the present invention is that the amount of concealed leading edge is kept to a minimum. In particular, the width between the meeting places 80 of the fuselage with the leading edges of the pivoted wings is substantially the same as the width between the lateral outer boundaries 82 of the forward ends of the air intake ducts. At the same time, these lateral outer boundaries 82 are a substantial distance forward of the meeting places 80. This is in contrast with variable-sweep aircraft in which the leading edges of the wings merge with structure in the nature of fixed wing roots, which are really a part of the fuselage, and which reduce the length of leading edge to which flaps can effectively be applied.

The fact that the lateral projections 54 on the fuselage are nowhere wider than at the air intakes means also that, in the laterally extended position shown in FIGURE 4, a maximum amount of trailing edge 84 of each wing is available, and can be provided with trailing flaps 86.

The fact that the leading edge 74 is on the wing 38 proper, and not on any portion of the fuselage, means that the leading edge can, as shown, be made straight nearly to the tip 88, and the angle of sweep-back on the entire leading edge will depend on the setting of the wing 38. As shown, the angle of sweep-back of the leading edge can be changed between 25° and 70°, the corresponding change in the angle of sweep-back of the trailing edge being between 15° and 60°. The chordal plane of the wings is spaced above the datum line 50 by about one third of the total height of the fuselage at the cross section containing the centre of gravity 52, and the wings are thus in "shoulder" position.

The tail plane 42 is delta-shaped with an anhedral angle of 5°, and joins the fuselage at a level a little below the datum line 50. The leading edge of the tail plane has an angle of sweep-back of 60°. When the main wings are swung back, a slot of substantial width remains between the wings and the tail plane, both vertically and horizontally. The angle incidence of the tail plane can be adjusted.

I claim:
1. An aircraft comprising
   (a) a fuselage
   (b) having at an upper part of each side a wing
   (c) and a substantially vertical pivot fixed in position in the fuselage,
   (d) each wing being mounted on the respective pivot so as to swing between a laterally extended position and a swept-back position,
   (e) two air-breathing jet propulsion engines side-by-side in the fuselage, aft of the pivot axes,
   (f) and duct means comprising two air intake ducts side-by-side having open forward ends at respective sides of the fuselage,
   (g) intermediate parts constituting the entire cross-section of the duct means passing between the pivot axes and wholly below the wings,
   (h) and a rear end connected to the respective engine,
   (i) the two intermediate parts abreast of the pivot axes lying close together
   (j) and having a combined side-to-side width of about one half the width between the pivot axes,
   (k) and a depth equal to the major part of the depth of the fuselage beneath the wings.
2. An aircraft comprising
   (a) a fuselage
   (b) having at an upper part of each side a wing
   (c) and a substantially vertical pivot fixed in position in the fuselage,
   (d) each wing being mounted on the respective pivot so as to swing between a laterally extended position and a swept-back position,
   (e) a single air-breathing jet propulsion engine, aft of the pivot axes,
   (f) and duct means comprising two air intake ducts, each having an open forward end at a respective side of the fuselage,
   (g) the ducts having intermediate parts constituting the entire cross-section of the duct means which join together at a position substantially between the pivot axes and wholly below the wings,
   (h) and a common rear part connected to the engine,
   (j) the portion of the common rear part abreast of the pivot axes having a width of about one half the width between the pivot axes,
   (k) and a depth equal to the major part of the depth of the fuselage beneath the wings.
3. An aircraft according to claim 1, having at each side a main undercarriage unit, means for retracting the unit by a forwards, upwards, and inwards movement, and a housing for the unit in the fuselage adjacent to and below the respective pivot and outboard of the intake ducts.
4. An aircraft according to claim 2, having at each side a main undercarriage unit, means for retracting the unit by a forwards, upwards and inwards movement, and a housing for the unit in the fuselage adjacent to and below the respective pivot and outboard of the intake ducts.

References Cited

UNITED STATES PATENTS

| | | | |
|---|---|---|---|
| 2,670,910 | 3/1954 | Hill et al. | 244—43 |
| 2,741,444 | 4/1956 | Baynes | 244—46 |
| 2,925,233 | 2/1960 | Dunn et al. | 244—43 |
| 3,206,146 | 9/1965 | Toms | 244—46 |
| 3,292,881 | 12/1966 | Ricardo | 244—46 |

MILTON BUCHLER, *Primary Examiner.*

B. BELKIN, *Assistant Examiner.*